United States Patent [19]
Kimbrow et al.

[11] Patent Number: 5,898,744
[45] Date of Patent: Apr. 27, 1999

[54] APPARATUS AND METHOD FOR CLOCK RECOVERY IN A COMMUNICATION SYSTEM

[75] Inventors: James W. Kimbrow, Georgetown; Raymond P. Voith, Austin; Matthew A. Pendleton, Cedar Park, all of Tex.

[73] Assignee: Motorola, Inc., Schaumburg, Ill.

[21] Appl. No.: 08/722,433

[22] Filed: Oct. 7, 1996

[51] Int. Cl.⁶ ................................. H03D 3/24; H04L 7/00
[52] U.S. Cl. ..................... 375/376; 376/372; 376/219; 370/516
[58] Field of Search ................................. 375/371, 372, 375/374, 375, 376, 327, 219; 327/147; 370/516

[56] References Cited

U.S. PATENT DOCUMENTS

| | | | |
|---|---|---|---|
| 5,367,545 | 11/1994 | Yamashita et al. | 375/372 |
| 5,402,452 | 3/1995 | Powell et al. | 375/372 |
| 5,500,874 | 3/1996 | Terrell | 375/232 |
| 5,548,624 | 8/1996 | Yoshida | 375/372 |
| 5,596,301 | 1/1997 | Rybicki et al. | 331/177 |

OTHER PUBLICATIONS

Alliance for Telecommunications Industry Solutions, "Asymmetric Digital Subscriber Line (ADSL) Metallic Interface", Draft American National Standard for Telecommunications, Network and Customer Installation Interfaces, T1E1.4/94–007R7, pp. i–xii and p. 170.

J. Bellamy, "Digital Telephony", Second Edition; John Wiley & Sons, Inc., Section 7.1.1 through Figure 7.4. (1994).

Primary Examiner—Stephen Chin
Assistant Examiner—Albert Park
Attorney, Agent, or Firm—Sandra L. Godsey; Daniel D. Hill

[57] ABSTRACT

A method for recovering the clock in an ADSL (asymmetric digital subscriber line) communication system at the receiver to match the frequency of the transmitted signal. A digital phase locked loop (DPLL) based clock is used to adjust the frequency of data read accesses from a FIFO (first-in first-out) memory (26) in a transceiver unit. The frequency is adjusted according to a predetermined offset value, where the offset value indicates the relative difference between a read location in the FIFO memory (26) and a write location. The predetermined offset value defines an operating point or nominal data location in the FIFO memory (26). A FIFO phase detector (31) determines and affects the frequency adjustment to maintain the FIFO memory at approximately the operating point. One embodiment provides clock recovery for a received ADSL subchannel and a means to recover a 16 kHz clock for a channel control.

15 Claims, 7 Drawing Sheets

APPARATUS AND METHOD FOR CLOCK RECOVERY IN A COMMUNICATION SYSTEM

FIELD OF THE INVENTION

The present invention relates generally to a communication system, and specifically to clock recovery in an asymmetric digital subscriber line (ADSL) communication system.

BACKGROUND OF THE INVENTION

As the complexity of communication systems increases, there is more and more need for additional ways of transmitting information. One method of communication is called Asymmetrical Digital Subscriber Line (ADSL) and is a transmission scheme that allows for the provision of plain old telephone service (POTS) and a variety of digital channels on two/wire twisted metallic wire pair with mixed gauges. It is desirable to use such twisted wire as there is an existing infrastructure, the use of which will reduce installation costs. ADSL standards are proposed in the draft American National Standard for Telecommunication—Network and Customer Interfaces—Asymmetric Digital Subscriber Line (ADSL) metallic interface, T1, E1.4/95-007R2, ADSL coding standard, draft, Aug. 15, 1995.

One of the advantages of ADSL transmission is that it may be used to provide high quality, multiple and simultaneous interactive video services. This is possible communicating over an ordinary telephone line without disruption of the standard telephone service. In traditional data communication systems, the transmission of clocking information is embedded in the data stream and may be implemented in a variety of ways, depending on line code technique. However, according to the ADSL standards, no such clocking information is permitted to be included in the transmission of ADSL data.

The prohibition of including clocking information in the transmission flow presents a problem in an ADSL system where an external network may provide input data streams driven at varying frequency which are independent of each other, and which are additionally independent of the ADSL transmission system clock. Under such conditions channel synchronization will be required between transmitting and receiving transceivers. Here the transmitter is referred to as a far end transceiver and the receiver is referred to as a near end transceiver.

In order to synchronize between far end and near end transceivers, the near end transceiver will require some method of tracking the far end data clock and adjust its data clock accordingly. Typically, a digital phase lock loop (DPLL) will be used for such a purpose.

According to ADSL standards, all input ports must be designed to tolerate a digital signal having electrical characteristics in accordance with the requirements of recommendation G.703. Additionally, recommendations G.823 and G.824 define further clock requirements regarding sinusoidal wander and jitter effects. Typically, wander effects are considered to be predominant at frequencies below 20 hertz, and for the most part, will influence the size of an input port first in first out (FIFO) logic.

To further satisfy ADSL standards, it is necessary to accommodate an ADSL byte stuff/delete operation performed at the far end, which causes a data arrival rate variation from the expected data arrival rate. This requires that a near end DPLL be a function of the expected data arrival rate adjusted by a far end byte stuff or byte delete operation due to far end data clock phase variations.

The ADSL standards specify transmission of data at frequencies equal to or above 32 kHz. This leaves the problem of transmitting 16 kHz control channel information on an ADSL system.

To solve these problems, it is desirable to have a near end transceiver capable of synchronization with a far end transceiver, which will be able to independently track the far end data clock and adjust its clock accordingly. Obviously, to operate within the ADSL domain requires conformity to regulations referred to in the ADSL standards mentioned here above.

DETAILED DESCRIPTION OF THE FIGURES

Figure 1:
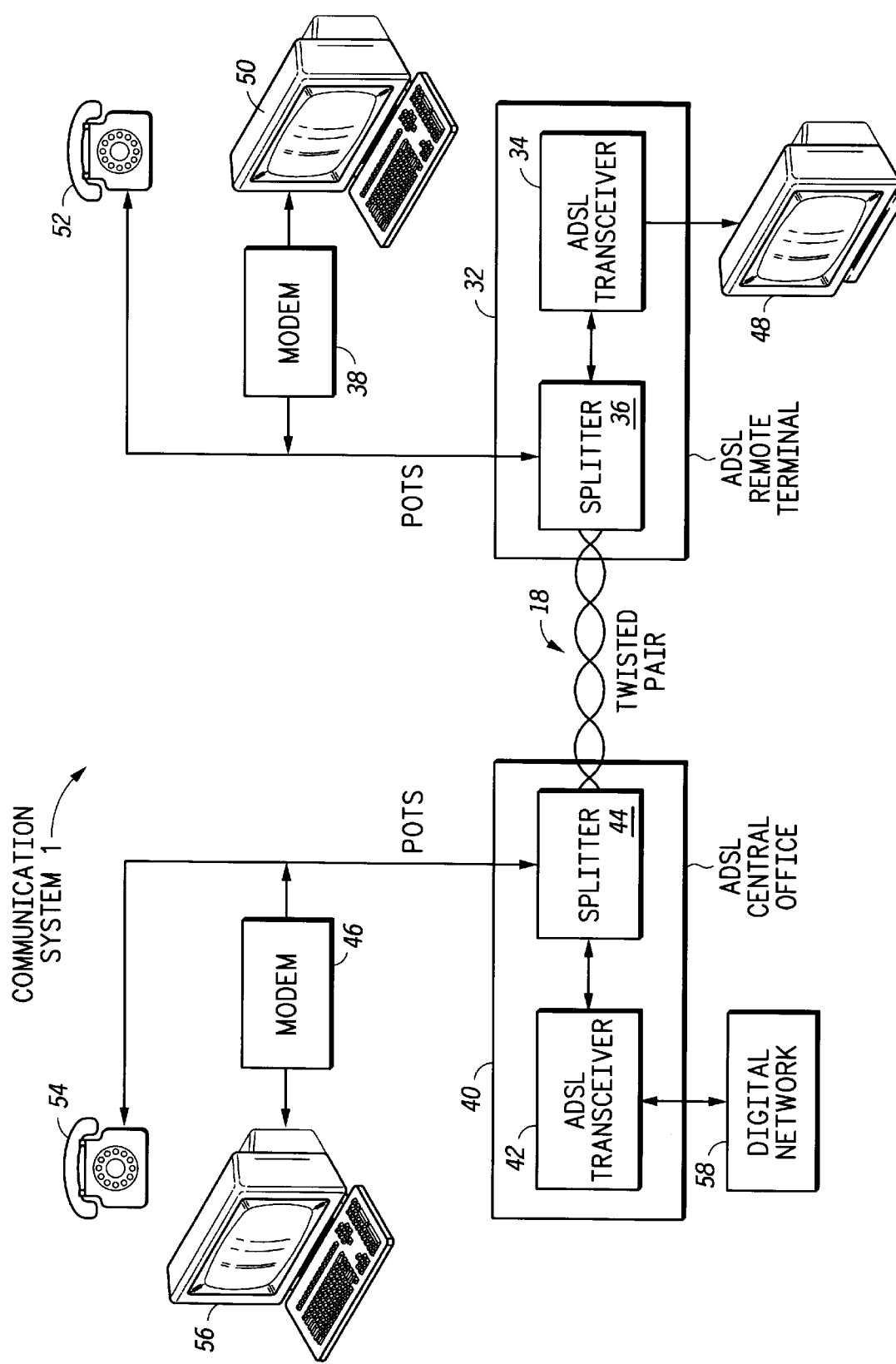
FIG. 1 illustrates, in block diagram form, an asymmetrical digital subscriber line (ADSL) communication system in accordance with one embodiment of the present invention.

FIG. 1 illustrates a communication system 1, according to one embodiment of the present invention, having a receiver 32 and a transmitter 40. Note that transmitter 40 is considered the ADSL central office while receiver 32 is considered the ADSL remote terminal. Transmitter 40 contains ADSL transceiver 42 and splitter 44. Transmitter 40 is coupled to receiver 32 by way of twisted pair 18. Receiver 32 includes splitter 36 and ADSL transceiver 34.

ADSL transceiver 42 is bi-directionally coupled to splitter 44, and is additionally bi-directionally coupled externally to digital network 58. ADSL transceiver 34 is bi-directionally coupled to splitter 36, and is additionally coupled to external devices 48. Splitter 44 is bi-directionally coupled to telephone line 54, while splitter 36 is bi-directionally coupled to telephone line 52. Splitter 44 is additionally coupled to modem 46 and splitter 36 is coupled to modem 58. Modem 58 is further coupled to external terminals 50 and modem 46 is coupled to external terminals 56.

Communication system 1 illustrated in FIG. 1 is an example of a typical digital communication network, where an external digital network communicates with a variety of users having computers, telephones, fax machines, modems, television sets, and any number of other communication devices. Digital network 58 is used to transmit such a variety of information, each of which having a different transmission format and frequency.

Figure 2:
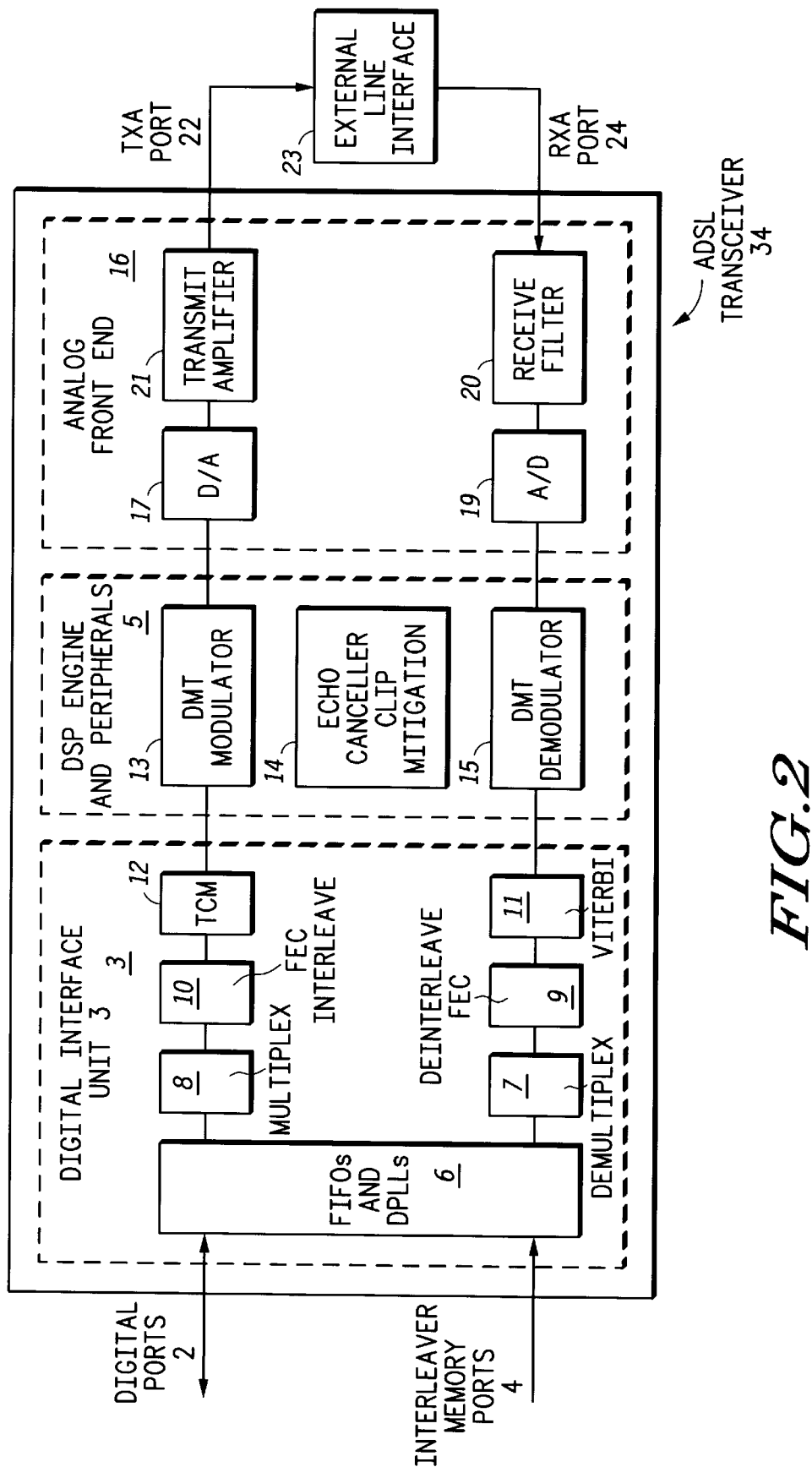
FIG. 2 illustrates, in block diagram form, an ADSL transceiver in accordance with one embodiment of the present invention.

FIG. 2 illustrates an ADSL transceiver 34 according to one embodiment of the present invention. Here, ADSL transceiver 34 may be a single chip embodiment and may also be used as ADSL transceiver 42. Referring to FIG. 2, ADSL transceiver 34 includes digital interface unit 3, which is coupled to digital signal processing (DSP) engine and peripherals 5. Further, DSP engine and peripherals 5 is coupled to analog front end 16. Digital interface unit 3 is bi-directionally coupled to digital ports 2 and uni-directionally coupled to memory ports 4.

Analog front end 16 contains analog/digital (A/D) 19 which is coupled to receive filter 20. Analog front end 16 further includes transmit amplifier 21 which is coupled to digital/analog (D/A) 17. Transmit amplifier 21 is further coupled to port 22. Receive filter 20 is coupled to port 24. Port 22 is then coupled to external line interface 23. External line interface 23 is coupled to port 24.

Continuing with FIG. 2, digital interface unit 3 also includes FEC (forward error correction) interleave 10 which is coupled to TCM (trellis code modulation) 12, multiplex 8 which is coupled to FEC interleave 10, De-interleave FEC 9 which is coupled to Viterbi 11, and demultiplex 7 which is coupled to de-interleave FEC 9. These modules are consistent with standard digital interface units known in the art. Digital interface unit 3, however, further includes FIFOs and DPLLs 6 which is coupled to both multiplex 8 and demultiplex 7, where FIFOs and DPLLs 6 of the present invention illustrated in FIG. 2 is not consistent with standard digital input/output known in the art. Additionally, ADSL transceiver 34 may include any number of other modules, which are not shown herein, such as a processor interface, timing ports, control ports, test ports, and any number of other modules.

Figure 3:
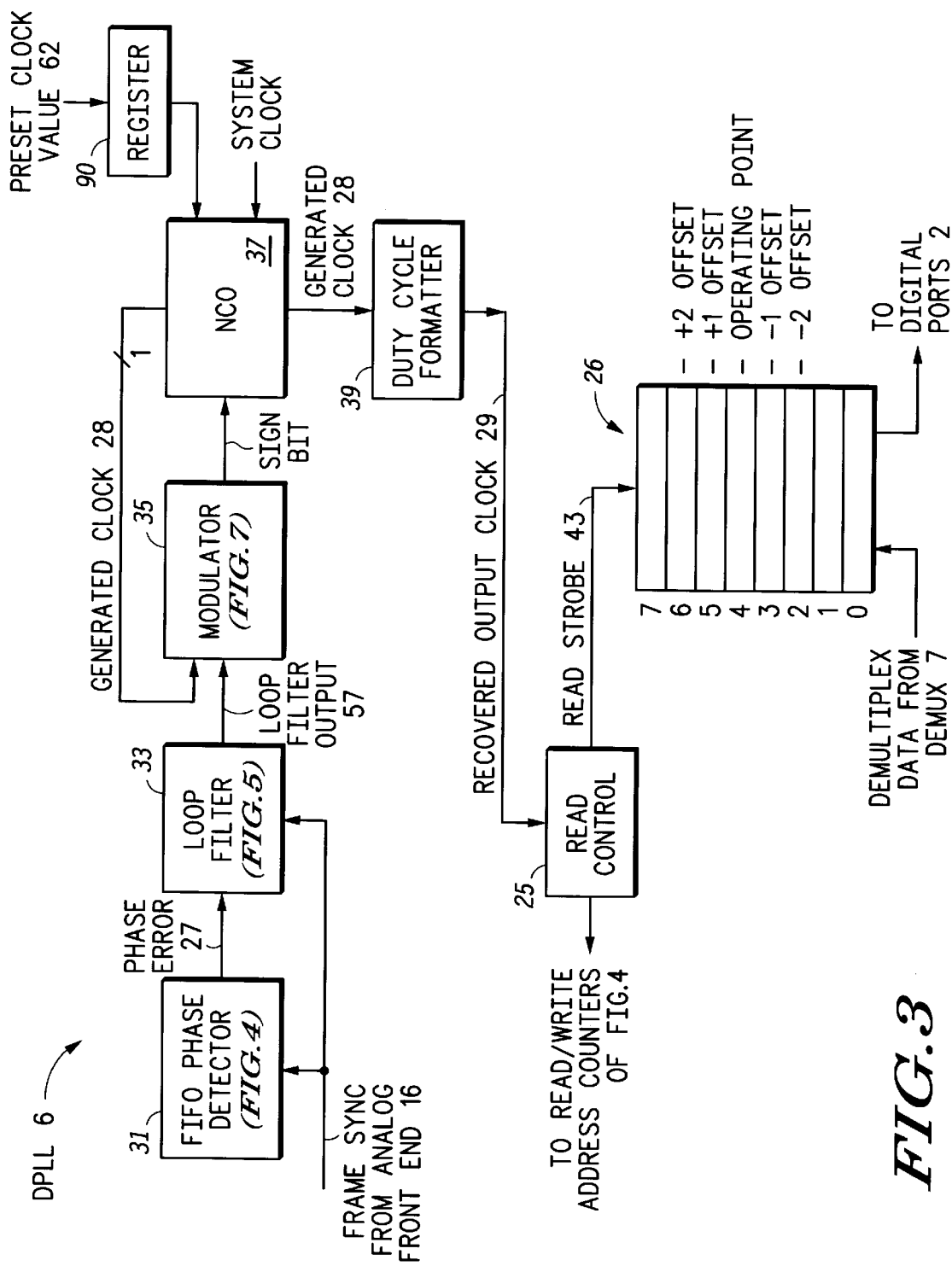
FIG. 3 illustrates, in block diagram form, the digital phase lock loop (DPLL) of FIG. 2 in accordance with one embodiment of the present invention.

FIG. 3 illustrates a detailed portion of FIFOs and DPLLs 6 from FIG. 2 according to one embodiment of the present invention. Here FIFO phase detector 31 receives a frame synchronizer signal (FRAME SYNC) originally received at analog front end 16. FIFO phase detector 31 provides phase error 27 information to loop filter 33 by way of multi-bit conductors. FIFO phase detector 31 is described in detail in FIG. 4. Loop filter 33 is described in detail in FIG. 5.

Referring again to FIG. 3, loop filter 33 also receives FRAME SYNC information originally received at analog front end 16. Loop filter 33 provides a smoothed loop filter output 57 to modulator 35 by way of multi-bit conductors. Modulator 35 provides a sign bit to numerically controlled oscillator (NCO) 37 by way of a single bit conductor. Modulator 35 quantizies smoothed loop filter output 57 in a finite range to provide sign bit 73, which functions as a speed control signal for controlling the rate at which FIFO memory 26 is emptied. NCO 37 receives a system clock signal. NCO 37 receives preset clock value 62 from register 90 by way of multiple conductors. In response to receiving preset clock value 62, the system clock signal, and the sign bit, NCO 37 provides a generated clock 28 to duty cycle formatter 39. Duty cycle formatter 39 outputs recovered output clock 29 to read control 25. In the illustrated embodiment, recovered output clock 29 has a logic high time for about 60 percent of a clock period. Read control 25 provides read strobe 43 to FIFO memory 26. As illustrated in FIG. 3, read strobe 43 is provided at a higher frequency when the number of filled locations of FIFO memory 26 is higher than the operating point of FIFO memory 26, and is provided at a lower frequency when the number of filled locations of FIFO memory 26 is lower than the operating point of FIFO memory 26. FIFO memory 26 receives demultiplexed data from demux 7 and provides an output to digital ports 2. Read control 25 then provides an output to FIFO read and write address counters 47, 19, as illustrated in FIG. 4.

FIFO memory 26 illustrated in FIG. 3, includes eight entries. Each entry representing a data point, to be filled with frame information. The organization is such that the first data written into FIFO memory 26 is the first memory read from FIFO 26. The information stored in FIFO memory 26 is a continuous stream of data, separated by frames as a function of frequency. The ordering is critical to proper transfer of information. Additionally, consider that information may be written into FIFO memory 26 at a first frequency and then read from FIFO memory 26 at a second frequency. If the first frequency is greater than the second frequency, data will begin to stockpile, and FIFO memory 26 will run out of storage spaces. Conversely, if the second frequency is less than the first frequency, data will not be available for reads.

To understand the present invention, it is helpful to explain the configuration of FIFO memory 26. FIFO memory 26 is a group of storage locations, illustrated for easy comprehension in FIG. 3 as a stack, but any number of configurations may be used. Each location is assigned a number, which in FIG. 3 are 0, 1, 2, . . . , 7. As an example, it is desirable to have a predetermined lag, between the time a location is written and the time it is read. In FIFO memory 26 illustrated in FIG. 3, the location labeled "operating point" represents that predetermined condition. In the example illustrated, reads performed at location 4 will be accurate, as location 4 is the current operating point which ensures a predetermined, sufficient lag time since the data was written in location 4. Note also that if location 4 in FIFO memory 26 is designated as an operating point, as in the illustrated example, location 5 will correspond to offset +1, location 6 will correspond to offset +2. Further, location 3 will correspond to offset −1, and location 2 will correspond to offset −2. When read is performed at a positive offset location, the lag between write and read is decreased. Likewise, when a read is performed at a negative offset location, the lag is increasing. Either of these conditions strays from the predetermined operating point.

Figure 4:
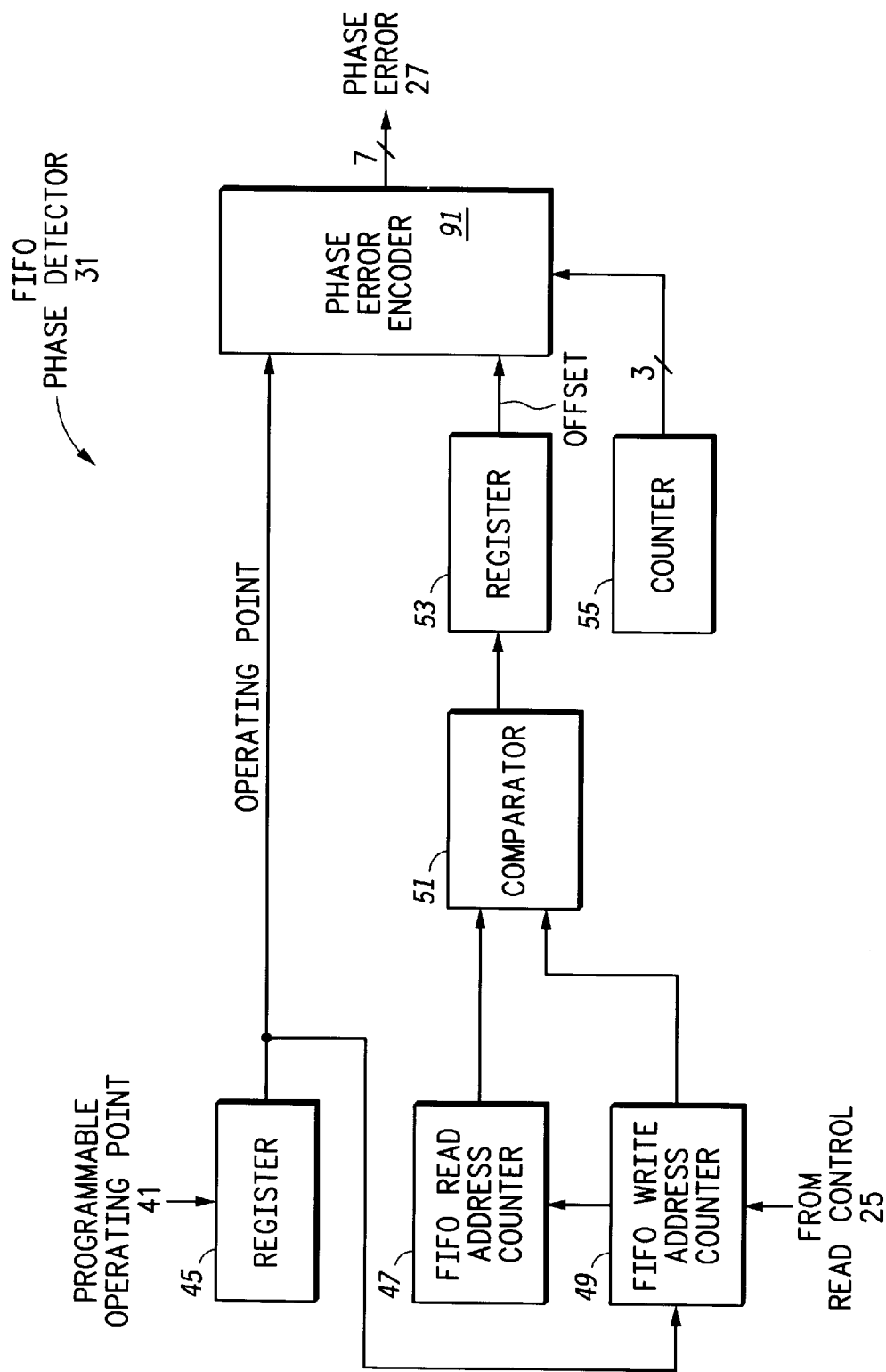
FIG. 4 illustrates, in block diagram form, a FIFO phase detector from FIG. 3 in accordance with one embodiment of the present invention.

Determination of the operating point and resultant phase error information, as finally provided in phase error 27, is affected in FIFO phase detector 31, illustrated in detail in FIG. 4. FIFO phase detector 31 receives programmable input point 41 information which is stored in register 45. Register 45 then provides this value as the operating point input to phase error encoder 91 and to FIFO write address counter 49.

As illustrated in FIG. 3, FIFO write address counter 49 receives information from read control 25. Referring again to FIG. 4, FIFO write address counter 49 is coupled to FIFO read address counter 47. FIFO write address counter 49 and FIFO read address counter 47 are each coupled to comparator 51 by way of uni-directional conductors. Comparator 51 then compares the read and write address count values provided by counters 49 and 47, and provides off-set information to register 53. The off-set information is provided to phase error encoder 91. Phase error encoder 91 is also coupled to counter 55 by way of three uni-directional conductors. Counter 55 monitors the number of remaining bits in a current byte being transferred, and provides a count value to phase error encoder 91. In response to receiving operating point information from register 45, offset information from register 53, and counter information from counter 55, phase error encoder 91 outputs phase error 27 on three uni-directional conductors. Phase error encoder 91 compares the offset to the operating point to produce an offset magnitude and concatenates the offset magnitude with the count value to generate the phase error 27. Phase error 27 is provided to loop filter 33, as illustrated in FIG. 3.

Figure 5:
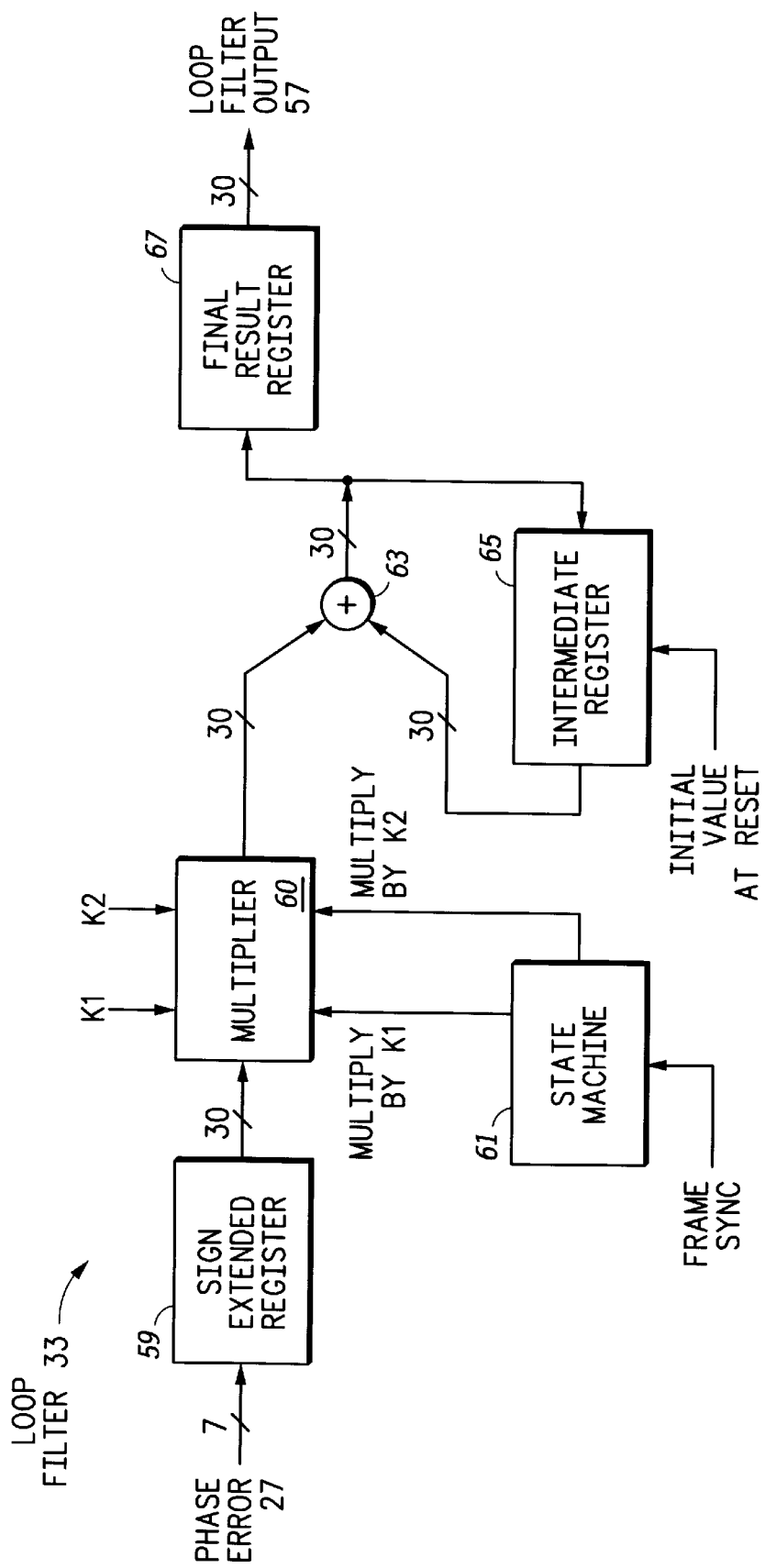
FIG. 5 illustrates, in block diagram form, a loop filter from FIG. 3, in accordance with one embodiment of the present invention.

Referring now to FIG. 5, one embodiment of loop filter 33 is provided in further detail. Phase error 27 is provided to sign extended register 59 on a seven bit bus. Sign extended register 59 is then coupled to multiplier 60 by way of a thirty bit bus. Multiplier 60 also receives inputs K1 and K2, to be used in subsequent operations. In one embodiment of the present invention, K1 is a linear constant and K2 is an integral constant, but in alternate embodiments may include other coefficients, constants or expressions which will effect the same filtering as performed in loop filter 33. Note also, alternate embodiments may employ any number of such expressions in order to realize such filtering.

The FRAME SYNC signal is provided to state machine 61, and state machine 61 is then coupled to multiplier 60 by way of two separate conductors. A first conductor, labeled "multiply by K1," controls multiplier 60 for a multiply by K1 operation performed by multiplier 60. A second separate conductor, labeled "multiply by K2," controls multiplier 60 for a multiply by K2 operation performed by multiplier 60. Multiplier 60 is coupled to an input to adder 63 by way of a thirty bit bus. Intermediate register 65 is coupled to an input of adder 63 by way of a uni-directional multi-bit bus. Intermediate register 65 is also bi-directionally coupled to result register 67. Note that the output of adder 63 is uni-directionally coupled to result register 67 and intermediate register 65. Intermediate register 65 receives an initial value at reset, and subsequent values from the output of adder 63. Result register 67 represents the final result of the internal operations of loop filter 33, and provides the resultant loop filter output 57 by way of a thirty bit bus.

Figure 6:
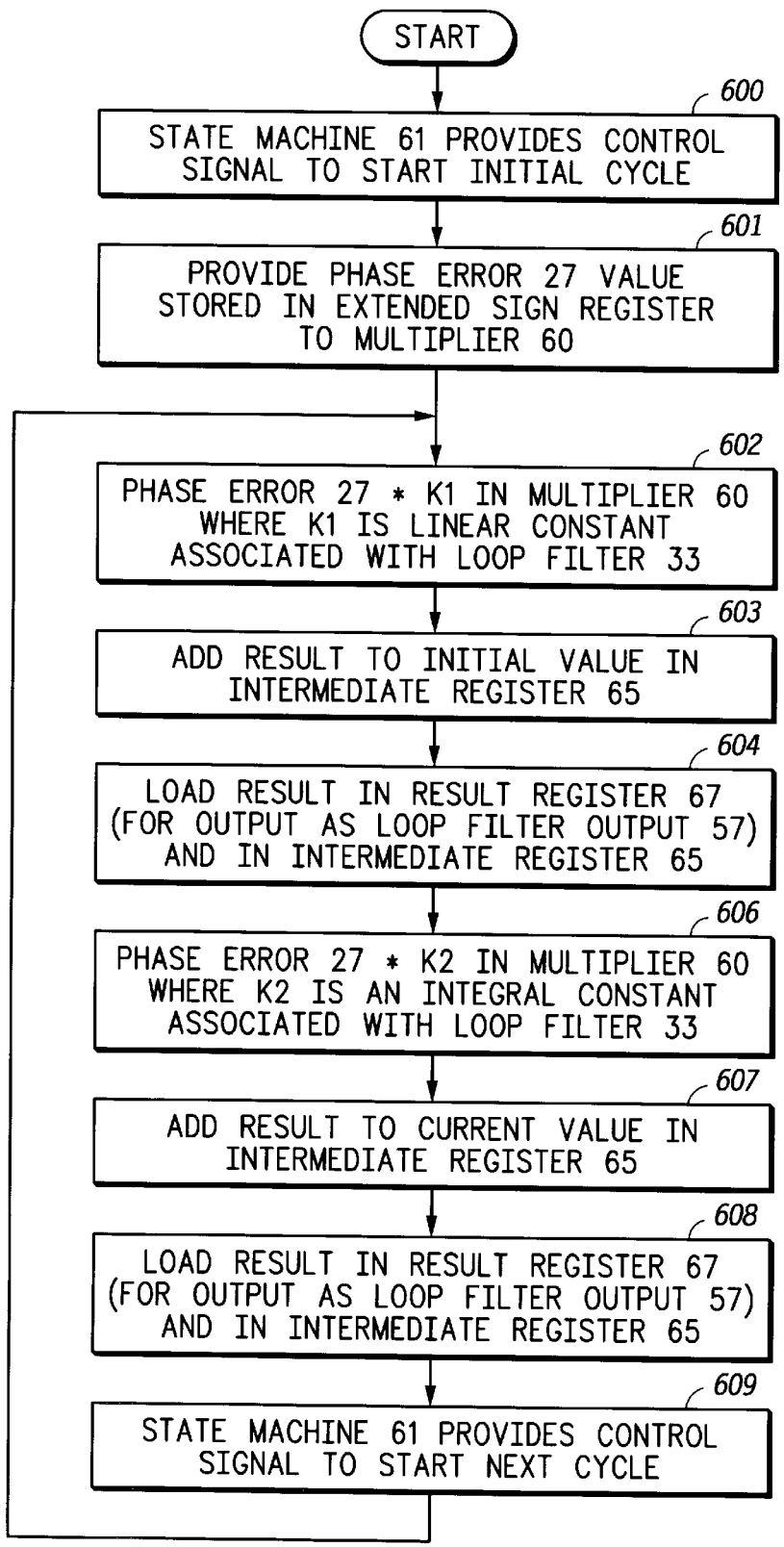
FIG. 6 illustrates, in flow diagram form, the operation of the loop filter of FIG. 3, in accordance with one embodiment of the present invention.

The operation of loop filter 33 is provided in the flow chart of FIG. 6. In one embodiment of the present invention, state machine 61 provides the control signal to start an initial cycle in step 600. Subsequently, in step 601, phase error 27 from sign extended register 59 is supplied to multiplier 60. In step 602, phase error 27 is then multiplied by K1 within multiplier 60, wherein K1 is a linear constant associated with loop filter 33. In step 603, the result of step 602 is added to the initial value in intermediate register 65. Continuing to step 604, the result from step 603 is loaded into result register 67, and will be provided as loop filter output 57.

Continuing in step 606 of the flow chart, phase error 27 is multiplied by K2 within multiplier 60. Here K2 is an integral constant associated with loop filter 33. Continuing to step 607, the result of step 606 is added to the current value in intermediate register 65. The value in intermediate register 65 is updated by the output of adder 63. In step 608, the result of step 607 is loaded into result register 67, to be output as loop filter output 57. The result of step 607 is also loaded in intermediate register 65. In step 609, state machine 61 provides a control signal to start the next cycle, which repeats steps 602–609. Note, that although not illustrated in FIG. 5, the loop continues as long as loop filter 33 receives phase error 27 information.

Referring again to FIG. 3, loop filter 33 provides loop filter output 57 to modulator 35. One embodiment of modulator 35 is illustrated in further detail in FIG. 7. Here loop filter output 57 is provided by way of a thirty bit bus to adder 70. Adder 70 is also coupled to register 78 by way of a uni-directional thirty bit bus. Generated clock 28 is provided to state machine 71. State machine 71 is then coupled to adder 70 by way of a uni-directional conductor. The output of adder 70 is a thirty bit bus which will be used to transfer an intermediate quantized result.

Register 78 receives feedback information from the output of adder 70. The most significant bit and sign bit of the quantized result are provided to adder 72 and multiplexer 74 by way of separate conductors. The output of adder 72 is provided as input to multiplexer 74. The output of multiplexer 74 provides a sign bit to register 77 and is also coupled with the intermediate quantized result to form a quantized result. Note that register 77 also receives generated clock 28. Register 77 is then further coupled to (±0.5) quantizer 76, which is coupled to adder 72 by way of a two bit uni-directional bus. Register 77 provides sign bit 73 as the output of modulator 35 and is used as a speed select control signal to control how fast FIFO memory 26 is emptied. In illustrated embodiment, the sign bit 73 only allows for two speed operation, however, in other embodiments, more bits may be used to provide more than two speeds. The quantized result is further provided to register 78. Note that the intermediate quantized output from adder 70 combined with the output of multiplexer 74 into the quantized result is provided to register 78 by way of a thirty bit bus, from which the sign bit 73 is taken.

DESCRIPTION OF A PREFERRED EMBODIMENT

The present invention offers a method of recreating, or recovering, the data clock in a receiver in an Asymmetrical Digital Subscriber Line (ADSL) Communications System. ADSL communication involves the transmitting of data from a central office transceiver to a remote transceiver. The input to the central office transceiver may include a variety of digital sources, and in particular may include video sources, such as broadcast video from information providers, and stored video and multimedia information. The central office may receive inputs from video encoders, broadband switching devices, and narrowband switching devices. The inputs are provided by way of a cable to the receiving transceiver. Typically, the information is combined into a single symbol packet which will include SYNC information, payload information and overhead.

An advantage is reached when twisted pair copper wiring is used for transmission of information from the central office to a remote site. In developing transceivers for ADSL communication, many telecommunication companies all over the world have tested a variety of methods. Problems exist when the transmission of the symbol packets from the central office is performed at a frequency different from the receiving frequency of the remote transceiver. ADSL communication systems are governed by ADSL standards for transmission. According to ADSL standards, transmitted symbol information is prohibited from including clocking information, therefore, a remote transmitter must make some adjustment for the difference in sending and receiving clocks. Typically, data received at a remote transceiver will be stored in a form of FIFO memory.

Referring to communication system 1 of FIG. 1, the ADSL central office, illustrated as transmitter 40, communicates with receiver 32 by way of twisted pair 18. Symbol information is therefore transmitted from transmitter 40 to receiver 32 by way of twisted pair 18. Transmitter 40 receives information from various sources in digital network 58. According to the present invention, ADSL transceiver 42 and ADSL transceiver 34 may each incorporate a similar device which may be illustrated as ADSL transceiver 34 in FIG. 2.

Each of transmitter 40 and receiver 32 further communicates with other terminals 50, 56 and phone lines 52, 54. As the need for ADSL communication increases there is more and more need to utilize existing infrastructure, which today is mainly copper twisted pair as illustrated here as twisted pair 18. The advantage of using existing infrastructure is the reduced cost or eliminated cost of installation. Since most systems have twisted pair in place, it is desirable to find a method of adjusting clocks without changing the transmission medium. The present invention offers a method for making timing adjustments at receiver 32 in a communication system 1, having twisted pair 18 transmission medium.

In one embodiment of the present invention, the ADSL transceiver 34 is as illustrated in FIG. 2. A digital interface unit 3 is used both for transmitting and receiving information. ADSL transceiver 34 may also contain many of the resources necessary to process ADSL signals. In application, a host processor would be used to control ADSL transceiver 34. Within ADSL transceiver 34, digital interface unit 3 is used to generate and recover the clock used for control of FIFO memory 26. A detailed description of this portion of this digital interface unit 3, is illustrated in FIG. 3.

The transmitted information is broken into frames. Each frame contains a symbol packet, and is transmitted at a certain frequency. FRAME SYNC information is then provided to FIFO phase detector 31 from analog front end 16. Referring to FIG. 4, where FIFO phase detector 31 is illustrated in detail, a programmable operating point 41 is a user programmable value for determining an offset between a read location and a write location in FIFO memory. Note that the FIFO phase detector 31 is in the data output path of an ADSL subchannel. The pre-defined offset or programmable offset 41 is down-loaded into register 45 by a host processor at initialization time. Note that the host processor is not illustrated in FIG. 2 but is inherent to the drawing.

On reset, this programmable offset 41 is loaded into FIFO write address counter 49. In one embodiment of the present invention all supported frequencies have an associated value for program offset 41, the main parameters for calculation include nominal ADSL sub-channel expected rate, an intrinsic jitter introduced within ADSL transceiver 34, a maximum end to end latency, and a maximum limit on the slip rates supported internally to ADSL transceiver 34 due to external central office transceiver clock tolerance.

In one embodiment of the present invention the FIFO memory 26 is initialized to a nominal location by filling it with enough data to prevent it from being totally emptied when the generated clock 28 is faster than the remote data clock. Here the FIFO memory 26 must be large enough to store additional data when the generated clock 28 is too slow to keep up with output clock 29. (illustrated in FIG. 3).

Referring to FIG. 5, state machine 61 controls multiplier 60 by providing either a multiply by K1 signal or a multiply K2 signal. A cycle is therefore defined by the provisions from state machine 61 of the multiply by K1 signal to multiplier 60. Alternatively, the provision of the multiply by K1 signal may be called for by a start of frame (SOF) signal.

The following discussion refers to FIFO memory 26, which is illustrated in FIG. 3. Note that an ideal operating point is located at location 4. In actual operation, data will be written to a first location in FIFO memory 26 and will be read from a second location in FIFO memory 26. The difference between the location associated with a write and the location associated with a read is called the offset value. For the operating point indicated here at location 4, the read location and write location will be separated by a predetermined offset. Operation at locations 5, 6, 3 or 2 indicates that the predetermined offset value has been violated. Operation at offset +1 indicates that the write location is one location above the operating location plus offset. Operation at offset −1 (i.e. location 3) indicates that the write location is one location below the operating location plus offset.

For clarity, we will call the operating point a nominal data location and the observed location will be the actual location. At the start of each cycle, the difference between the nominal data location and the actual location, is an indication of a potential phase difference in the generated clock 28 with respect to the system clock of central office transmitter 40. When the actual location moves outside of the predefined offset value range from the nominal data location, an adjustment is made to generated clock 28. The actual location corresponds to a FIFO read location. Referring to FIG. 3, FIFO memory 26 location 5 is an increase in FIFO memory 26 from the operating point which is located at location 4. As the FIFO location increases from the nominal data location, a positive value is sent to loop filter 33. This positive value indicates that the difference between the read location and the write location is beyond the predetermined offset value. Using the present invention, phase error encoder 91 illustrated in FIG. 4, will ensure that all linear increases in locations of FIFO memory 26 are tracked by loop filter 33. Therefore, as the location in FIFO memory 26 increases the number sent to loop filter 33 increases. Likewise, as the location in FIFO memory 26 decreases, the number sent to loop filter 33 also decreases.

Note that read and write address counters illustrated in FIG. 4 as FIFO read address counter 47 and FIFO write address counter 49 respectively, are post incremented and therefore the difference is registered every system clock, according to one embodiment of the present invention. Phase error encoder 91 provides encoded values of phase error 27 to loop filter 33. In one embodiment of the present invention phase error 27 is provided to loop filter 33 every 4 kHz. Basically, loop filter 33 receives phase error 27 from FIFO phase detector 31 and uses this encoded value to produce loop filter output 57 for modulator 35.

Referring to FIG. 5, phase error 27 is provided to sign extended register 59. Note that it is within loop filter 33 that a start of frame signal is initiated by state machine 61 by providing a multiply by K1 signal to multiplier 60. The overall transfer function for loop filter 33 as illustrated in FIG. 5, is $[K2/(1-z^{-1}) +K1]$. The loop filter operates using two constant terms K1 and K2. K1 is a linear term and K2 is an integral term. K1 and K2 are both user programmable terms.

FIG. 6 provides in flow chart form, the sequential operation of loop filter 33. Start in FIG. 6 indicates the initial start up of ADSL transceiver 34, and loop filter 33 in particular. In step 600 state machine 61 provides the initial start of frame indication to multiplier 60 by providing multiply by K1 signal. Note that state machine 61 receives FRAME SYNC information. Based on the FRAME SYNC information received, which is information included in the symbol information transmitted by transmitter 40, state machine 61 determines a start of frame. State machine 61 also applies a delay prior to application of the multiply by K2 signal. The delay affected by state machine 61 between provision of multiply by K1 signal and multiply by K2 signal is determined by the size of constants K1 and K2. Step 600 in FIG. 6 refers to the provision of the multiply by K1 signal. Continuing to step 601, phase error 27 has been stored in sign extended register 59 for provision 2 multiplier 60. Multiplier 60 multiplies K1 by phase error 27. The result of this multiply operation has been added to an initial value which is in intermediate register 65 at the time of reset. Note that at startup this data is not valid. The result of this addition is provided to result register 67 which further provides the result as loop filter output 57. Additionally, the result of addition in adder 63 is fed back to intermediate register 65. Note that the result stored on result register 67 from this initial cycle at step 604 is not valid information.

Continuing to step 605, state machine 61 now provides signal multiply by K2 to multiplier 60, indicating multiplier 60 is to multiply K2 by phase error 27. This is performed in step 606. The result of step 606 is then added to the value of an intermediate register 65 which has been updated since reset. The result of step 607 is then stored in result register 67. At this point valid data is contained in result register 67, and is consistent with the transfer function given here and above. Note that the value stored in register 67 are provided as loop filter output 57. Subsequent cycles are performed in the same manner, however, once loop filter 33 contains valid information in result register 67, subsequent cycles will contain recent valid information in result register 67.

Figure 7:
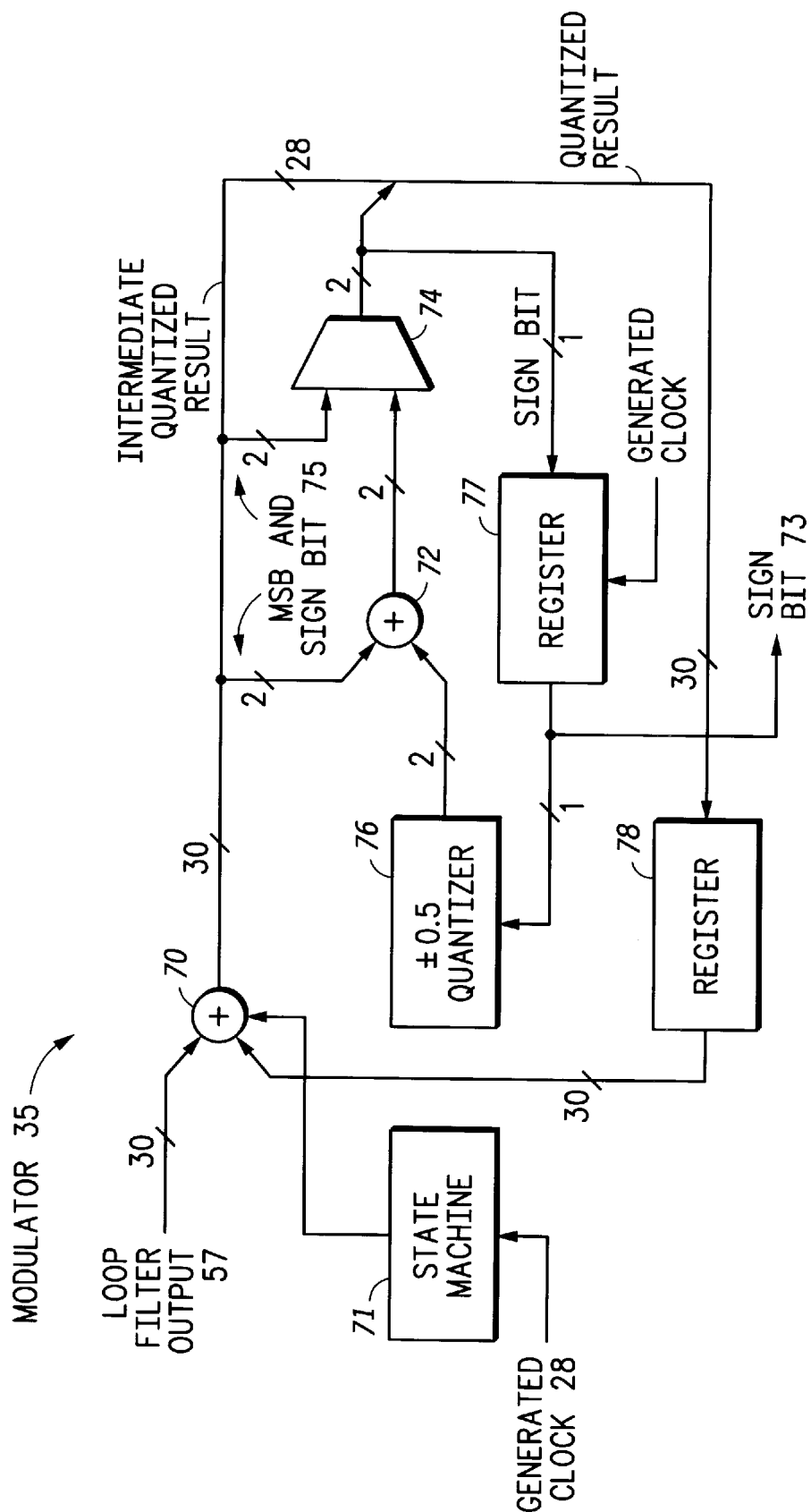
FIG. 7 illustrates, in block diagram form, a modulator from FIG. 3, in accordance with one embodiment of the present invention.

Modulator 35, as illustrated in FIG. 7, receives loop filter output 57. Modulator 35 controls the selection of the NCO 37. The NCO 37 is used to determine the rate of the generated clock 28. NCO 37 output is a one system clock wide pulse and the NCO 37 output period will be a multiple of the system clock period.

Referring again, to FIG. 3, NCO 37 provides generated clock 28 to duty cycle formatter 39 which produces an output clock 29 which is used to control read strobe 43 by way of read control 25. In this way, the FIFO read frequency is adjusted according to the relation of the read location and the write location with respect to the offset value.

The present invention offers a method of recovering the clock at a receiver 32 where the transmitter 40 is supplied by sources having different clock sources which are independent of each other and even if those frequencies are independent of the transmitters system. Additionally, the present invention offers a method of providing bearer channel synchronization between a central office and a remote terminal. The present invention overcomes the drawbacks of prior solutions which involved use of a digital phase locked loop (DPLL) but which offered no method of clock recovery or synchronization. To meet the bearer channel synchronization requirements, the present invention incorporates a DPLL at the output port which may be used to track the central office, or far end clock and adjust the output clock accordingly. The DPLL based clock of the present invention described herein is derived from an average arrival rate of the receiver's subchannel data and is affected by operation at the far end. The present invention follows the recommendations of the ADSL standard as described herein above.

Further, the present invention offers an ADSL transceiver as illustrated in ADSL transceiver 34 of FIG. 2, which is a single integrated circuit transceiver device including the clock recovery, DPLL circuitry. One embodiment of the present invention is designed using the DMT line code for 256 downstream carriers and 32 upstream carriers with 4.3124 kHz spacing, each of which are capable of carrying up to 15 bits. The DMT line code is one of several modulation schemes known as multi-carrier modulation schemes. In a multi-carrier system, the global channel band is divided into a large number of small subchannels. Separate carriers are assigned to each sub channel. The incoming data is allocated to each carrier based on that sub channel's ability to send data as defined by its signal-to-noise ratio (SNR). Any subchannel that cannot send data is not used. Each subchannel is sufficiently narrow that line distortion across the channel appears flat so that subchannel equalization is not required since the multi-carrier system optimizes each subchannel for minimum probability of error, the whole set of subchannels optimizes use of the available bandwidth for the channel.

The form of multi carrier modulation used in one embodiment of the present invention is know as discrete multi tone or DMT, which uses 256 downstream carriers and 32 upstream carriers. DMT for ADSL is efficiently implemented using digital signal processor (DSP) devices. Instead of the 256 transmitters and receivers that would be required for other forms of multi carrier and modulation in the downstream case, DMT makes use of the discrete Fourier transform algorithm and its inverse (FFT and IFFT respectively) to form the demodulation and modulation of all of the carriers.

The present invention ADSL transceiver also accepts digital input data for transmission on the line, and is therefore applicable as a central office transmitter.

The present invention is specifically applicable as a remote terminal, where the problems of clock recovery and synchronization are most acute.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

TELECOMMUNICATION TERMS

American Standard: Draft American National Standard for Telecommunication—Network and Customer Interfaces—Asymmetric Digital Subscriber Line (ADSL) metallic interface, T1, E1.4/95-007R2. ADSL coding standard, draft, Aug. 15, 1995.

bearer channel—A User data stream of specified rate that is transported transparently by an ADSL transceiver and carrier. A bearer service is sometimes abbreviated to "bearer".

A/D—analog to digital

ADSL—asymmetric digital subscriber line

CO—central office

DMT—discrete multi-tone

FFT—fast Fourier transform

IFFT—inverse fast Fourier transform

POTS—plain old telephone service

RT—remote terminal

SNR—signal-to-noise ratio

What is claimed is:

1. An apparatus for clock recovery in a communications system, comprising:

a digital phase locked loop for receiving a read address count value, a write address count value, a frame synchronizer signal, and a predetermined operating point, and in response, providing a recovered output clock, the digital phase locked loop comprising:

a phase detector for comparing the read address count value to the write address count value to produce an offset, and for comparing the offset to the predetermined operating point to provide a phase error;

a loop filter, coupled to the phase detector, for receiving the phase error, and in response, providing a smoothed loop filter output signal;

a modulator, coupled to the loop filter, for receiving the smoothed loop filter output signal, and in response, quantizing the smoothed loop filter output signal in a finite range to provide a speed select control signal; and a numerically controlled oscillator, coupled to the modulator, for providing the recovered output clock of a predetermined frequency in response to the speed select control signal;

a read control circuit, coupled to the digital phase locked loop, for receiving the recovered output clock, and in response, providing a read strobe; and a first-in first-out memory, coupled to the read control circuit for receiving the read strobe and for receiving data, and in response to a frequency of the read strobe, providing the data from the first-in first-out memory at a recovered data rate, wherein the recovered data rate maintains a number of filled locations in the first-in first-out memory at approximately the predetermined operating point.

2. The apparatus of claim 1, further comprising a duty cycle formatter providing the recovered output clock having a logic high time for about 60 percent of a clock period.

3. The apparatus of claim 1, wherein the phase detector comprises:

a comparator for comparing the read address count value to the write address count value to produce the offset;

a counter for monitoring a number of remaining bits in a current byte being transferred, and providing a count value in response; and a phase error encoder for receiving the offset, the predetermined operating point, and the count value, and in response, comparing the offset to the predetermined operating point to produce an offset magnitude, and for concatenating the count value to the offset magnitude to generate the phase error.

4. The apparatus of claim 1, wherein the modulator comprises:

a first adder for adding the smoothed loop filter output signal to a current quantized result to provide an intermediate quantized result;

a quantizer for providing first and second predetermined quantizing values;

a second adder for adding a most significant bit and a sign bit from the intermediate quantized result to one of the first and second quantizing values to produce an intermediate sign magnitude result;

a multiplexer having a first input coupled to the second adder, a second input coupled to the first adder for receiving the most significant bit and a sign bit, and an output combined with the intermediate quantized result to produce the current quantized result;

a first register having an input terminal coupled to the output of the multiplexer, and an output coupled to the quantizer for selecting either of the first or second quantizing values based on the sign bit; and a second register having an input terminal for receiving the current quantized result, and an output terminal coupled to the first adder.

5. The apparatus of claim 1, wherein the loop filter comprises:

a sign extended register having an input terminal for receiving the phase error, and an output terminal for providing a sign extended phase error;

a multiplier having an input terminal coupled to the output terminal of the sign extended register, the multiplier for multiplying the sign extended phase error by a first constant and a second constant, and for providing a result to an output terminal;

an adder having a first input terminal coupled to the output terminal of the multiplier, a second input terminal, and an output terminal;

an intermediate result register having an input terminal coupled to the output terminal of the adder, and an output terminal coupled to the second input terminal of the adder;

a final result register having an input terminal coupled to the output terminal of the adder, and an output terminal for providing the smoothed loop filter output signal; and a state machine, coupled to the multiplier, for controlling a sequence of the multiplication of the sign extended phase error by the first and second constants.

6. The apparatus of claim 1, wherein the communications system is characterized as being an asymmetric digital subscriber line (ADSL) system.

7. The apparatus of claim 1, wherein the read strobe is provided at a relatively higher frequency when the number of filled locations of the first-in first-out memory is higher than the predetermined operating point, and the read strobe is provided at a relatively lower frequency when the number of filled locations of the first-in first-out memory is lower the predetermined operating point.

8. A method for clock recovery in a communications system, comprising the steps of:

comparing a read address count value to a write address count value to produce an offset;

comparing the offset to a predetermined operating point to provide a phase error;

filtering the phase error to provide a smoothed loop filter output signal;

quantizing the smoothed loop filter output signal in a finite range to provide a speed select control signal; and providing a recovered clock of a predetermined frequency in response to the speed select control signal.

9. The method of claim 8, wherein the step of filtering further comprises the steps of:

sign extending the phase error to produce a sign extended phase error;

multiplying the sign extended phase error by a first constant to obtain a first result;

adding the first result to an intermediate register and storing the output to a final result register;

multiplying the sign extended phase error by a second constant to obtain a second result; and adding the second result to the output to obtain a third result and storing the third result in the intermediate register.

10. The method of claim 8, wherein the step of quantizing further comprises the steps of:

adding the smoothed loop filter output signal to a current quantized result to produce an intermediate quantized result;

adding a most significant bit and a sign bit of the intermediate quantized result to a first or second predetermined quantizing value to produce an intermediate sign magnitude result;

determining which of the first or second predetermined quantizing values to add to the intermediate quantized result based on the sign bit;

concatenating the sign bit with the intermediate quantized result to produce the current quantized result; and recovering the sign bit from the current quantized result to produce the speed select control signal.

11. An ADSL transceiver having a receive portion and a transmit portion, the receive portion comprising:

a digital phase locked loop for receiving a read address count value, a write address count value, a frame synchronizer signal, and a predetermined operating point, and in response, providing a recovered output clock, the digital phase locked loop comprising:

a phase detector for comparing the read address count value to the write address count value to produce an offset, and for comparing the offset to the predetermined operating point to provide a phase error;

a loop filter, coupled to the phase detector, for receiving the phase error, and in response, providing a smoothed loop filter output signal;

a modulator, coupled to the loop filter, for receiving the smoothed loop filter output signal, and in response, quantizing the smoothed loop filter output signal in a finite range to provide a speed select control signal; and a numerically controlled oscillator, coupled to the modulator, for providing the recovered output clock of a predetermined frequency in response to the speed select control signal;

a read control circuit, coupled to the digital phase locked loop, for receiving the recovered output clock, and in response, providing a read strobe; and a first-in first-out memory, coupled to the read control circuit for receiving the read strobe and for receiving data, and in response to a frequency of the read strobe, providing the data from the first-in first-out memory at a recovered data rate, wherein the recovered data rate maintains a number of filled locations in the first-in first-out memory at approximately the predetermined operating point;

wherein the read strobe is provided at a higher frequency when the number of filled locations of the first-in first-out memory is higher than the predetermined operating point, and the read strobe is provided at a lower frequency when the number of filled locations of the first-in first-out memory is lower the predetermined operating point.

12. The ADSL transceiver of claim 11, further comprising a duty cycle formatter providing the recovered output clock having a logic high time for about 60 percent of a clock period.

13. The ADSL transceiver of claim 11, wherein the phase detector comprises:

a comparator for comparing the read address count value to the write address count value to produce the offset;

a counter for monitoring a number of remaining bits in a current byte being transferred, and providing a count value in response; and a phase error encoder for receiving the offset, the predetermined operating point, and the count value, and in response, comparing the offset to the predetermined operating point to produce an offset magnitude, and for concatenating the count value to the offset magnitude to generate the phase error.

14. The ADSL transceiver of claim 11, wherein the modulator comprises:

a first adder for adding the smoothed loop filter output signal to a current quantized result to provide an intermediate quantized result;

a quantizer for providing first and second predetermined quantizing values;

a second adder for adding a most significant bit and a sign bit from the intermediate quantized result to one of the first and second predetermined quantizing values to produce an intermediate sign magnitude result;

a multiplexer having a first input coupled to the second adder, a second input coupled to the first adder for receiving the most significant bit and a sign bit, and an output concatenated with the intermediate quantized result to produce the current quantized result;

a first register having an input terminal coupled to the output of the multiplexer, and an output coupled to the quantizer for selecting either of the first or second quantizing values based on the sign bit; and a second register having an input terminal for receiving the current quantized result, and an output terminal coupled to the first adder.

15. The ADSL transceiver of claim 11, wherein the loop filter comprises:

a sign extended register having an input terminal for receiving the phase error, and an output terminal for providing a sign extended phase error;

a multiplier having an input terminal coupled to the output terminal of the sign extended register, the multiplier for multiplying the sign extended phase error by a first constant and a second constant, and for providing a result to an output terminal;

an adder having a first input terminal coupled to the output terminal of the multiplier, a second input terminal, and an output terminal;

an intermediate result register having an input terminal coupled to the output terminal of the adder, and an output terminal coupled to the second input terminal of the adder;

a final result register having an input terminal coupled to the output terminal of the adder, and an output terminal for providing the smoothed loop filter output signal; and a state machine, coupled to the multiplier, for controlling a sequence of the multiplication of the sign extended phase error by the first and second constants.

* * * * *